United States Patent [19]

Davis

[11] Patent Number: 5,167,569
[45] Date of Patent: Dec. 1, 1992

[54] METHOD AND APPARATUS FOR REMOVING A HIDE FROM A CARCASS

[75] Inventor: Albert D. Davis, Greenley, Colo.

[73] Assignee: Monfort, Inc., Greeley, Colo.

[21] Appl. No.: 695,253

[22] Filed: May 3, 1991

[51] Int. Cl.⁵ .............................................. A22B 5/16
[52] U.S. Cl. ..................................... 452/130; 452/187
[58] Field of Search ............... 452/130, 125, 128, 129, 452/187

[56] References Cited

U.S. PATENT DOCUMENTS

| | | | |
|---|---|---|---|
| 3,737,949 | 6/1973 | Davis | 452/129 |
| 3,863,294 | 2/1975 | Barbee | 17/21 |
| 3,895,416 | 7/1975 | Haws | 17/21 |
| 4,035,868 | 7/1977 | Gardner et al. | 452/128 |
| 4,229,860 | 10/1980 | Irwin | 17/50 |
| 4,307,490 | 12/1981 | Watkins et al. | 17/50 |
| 4,320,559 | 3/1982 | Couture | 17/50 |
| 4,392,274 | 7/1983 | Noroy | 17/21 |
| 4,417,367 | 11/1983 | Leining | 17/21 |
| 4,438,546 | 3/1984 | Couture | 17/50 |
| 4,653,149 | 3/1987 | Swilley | 17/21 |
| 4,751,768 | 6/1988 | Trujillo, Sr. | 17/50 |
| 4,873,749 | 10/1989 | Couture | 17/50 |
| 4,934,027 | 6/1990 | Kjorum et al. | 17/50 |

FOREIGN PATENT DOCUMENTS

| | | | |
|---|---|---|---|
| 251963 | 6/1964 | Australia | 452/129 |
| 822865 | 9/1969 | Canada | 452/130 |
| 104117 | 3/1984 | European Pat. Off. | 452/130 |
| 1393383 | 5/1986 | U.S.S.R. | 452/129 |
| 2233541 | 1/1991 | United Kingdom | 452/187 |

*Primary Examiner*—Willis Little
*Attorney, Agent, or Firm*—Sheridan, Ross & McIntosh

[57] ABSTRACT

A method and apparatus is provided for removing a hide (14) from a carcass (12). A plurality of counterrotating members (18) engage a portion of the hide (14) hanging from the carcass (12). The counterrotating members (18) are then moved together to exert a gripping force on the hide (14). The counterrotating members (18) exert a pulling force on the hide (14) effective to remove the hide (14) from the carcass (12). The present invention provides an improved rate of hide (14) removal, reduces hide (14) damage, and reduces hazardous working conditions.

45 Claims, 7 Drawing Sheets

METHOD AND APPARATUS FOR REMOVING A HIDE FROM A CARCASS

TECHNICAL FIELD OF THE INVENTION

This invention relates in general to the processing of animal carcasses in a slaughterhouse, and in particular to a method and apparatus for removing a hide from a carcass.

BACKGROUND OF THE INVENTION

In a slaughterhouse processing line, a hide is commonly removed from a carcass by a hide-pulling assembly such as a downpulling assembly. Typically, downpulling assemblies are used in processing lines wherein the carcass is suspended from a conveyor by its hind legs so that the longitudinal direction of the carcass is transverse to the path of the conveyor. The downpulling assembly pulls downwardly on the hide so that at least a portion thereof is detached from the carcass. The downpuller may remove the entire hide by pulling the hide over the carcass' head.

In some known downpulling assemblies, such as those disclosed in U.S. Pat. No. 4,299,860 and 3,737,949, an operator is required to engage the downpulling assembly with the hide. The assembly disclosed in the '860 patent employs a rotating skinning drum to which the hide is attached by a chain. One end of the chain is fixed to the drum and the operator attaches the other end of the chain to a hide portion. The hide is then wrapped around the drum as the drum rotates. Of course, the hide must be unwrapped from the drum before the next hide pulling operation, thereby slowing the processing line. The '949 patent discloses an assembly where an operator rides a carriage which moves with the carcass as the hide is pulled therefrom. The operator inserts a hide portion between a pair of counterrotating wringer elements which apply a pulling force effective to remove the hide. The carriage is moved downwardly along the back of the carcass during the hide pulling operation.

Assemblies which require an operator for engagement of the hide have a number of drawbacks. First, the operators are exposed to extremely dangerous working conditions. In order to remove the hides, the downpulling assemblies must be capable of generating great pulling force. Operators working in close proximity to these machines have suffered serious injuries including severed arms from entanglement with the machinery. Second, the use of an operator adds cost to the overall processing of carcasses. Thus, for safety considerations as well as cost reduction considerations, it is desirable to engage hides without manual implementation. Such a method and apparatus could, by reducing the manpower requirements of the slaughterhouse, also improve food-product hygiene.

Other known downpulling assemblies, such as that disclosed in U.S. Pat. No. 4,307,490, concentrate large pulling forces on a relatively small portion of the hide. In the '490 assembly, a portion of the hide is inserted between gripping jaws mounted on a shaft. The pulling force can then be exerted by driving the shaft downward. In such assemblies, the pulling force is concentrated on a relatively small portion of the hide increasing the likelihood of hide damage. It is desirable to eliminate damage because animal hides are commercially valuable products.

In addition, current downpulling assemblies may slow the processing line due to operator and equipment inefficiencies thereby limiting plant capacity. In some processing lines employing downpulling assemblies, the conveyor is stopped while the hide is pulled from the carcass. If the conveyor continued to move while a fixed downpulling assembly pulled on the carcass, lateral forces would be exerted on the conveyor. These lateral forces would place additional stress on the conveyor drive means and tend to cause components of the drive means to slip, e.g., a drive chain could slip on its sprockets or slippage could occur between gears.

None of the known downpulling assemblies solve the dangerous working conditions, hide damage, and line delay problems described above. Thus, there is a need for a method and apparatus for pulling hides from carcasses which greatly reduces dangerous working conditions, increases processing line speed and reduces the likelihood of hide damage.

SUMMARY OF THE INVENTION

The present invention disclosed herein comprises a method and apparatus for pulling the hide from an animal carcass which reduces or substantially eliminates problems associated with prior downpulling assemblies. The present invention allows the pulling force to be spread relatively evenly over the hide so that hide damage is reduced. In addition, the present invention allows the hide pulling assembly to engage the hide automatically, i.e., without manual implementation, so that dangerous working conditions are reduced. The present invention also allows the hide pulling assembly to move laterally to match the movement of the carcass conveyor so that it is not necessary to stop the processing line while the hide is pulled from the carcass.

In accordance with one aspect of the present invention, a method and apparatus for removing a hide from a carcass is provided wherein the hide is automatically engaged between a plurality of counterrotating members. The members are positioned substantially beneath the carcass to receive a hide portion freely hanging from said carcass. A means for raising the assembly is provided so that the hide is engaged between the members in a raised position.

According to another aspect of the present invention, the hide is gripped and pulled from the carcass by the counterrotating members. After the hide is engaged between the members, the members may be moved together to exert a gripping force on the hide. The counterrotating members thereby exert a force on the hide effective to pull the hide from the carcass. The members may be moved downward to exert an additional pulling force on the hide thereby assisting in removal of the hide. Additionally, an electrical current may be applied to stiffen the carcass and reduce the likelihood of carcass spinal separation and stretching or tearing of the adjacent meaty portions. The assembly may also be moved laterally to substantially match the movement of the carcass as the hide is pulled, thereby eliminating the need to stop the processing line at the hide pulling station.

It is an advantage of the present invention that a hide can be removed automatically, thereby reducing dangerous working conditions, reducing labor requirements, and improving hygiene. It is a further advantage of the present invention that the pulling force is more evenly spread over the hide, thereby reducing the likelihood of hide damage. The present invention also improves the rate of hide removal, further enhancing plant profitability.

BRIEF DESCRIPTION OF THE DRAWINGS

For a more complete understanding of the present invention and for further advantages thereof, reference is now made to the following Detailed Description taken in conjunction with an accompanying Drawings, in which.

DETAILED DESCRIPTION OF THE INVENTION

Figure 1:
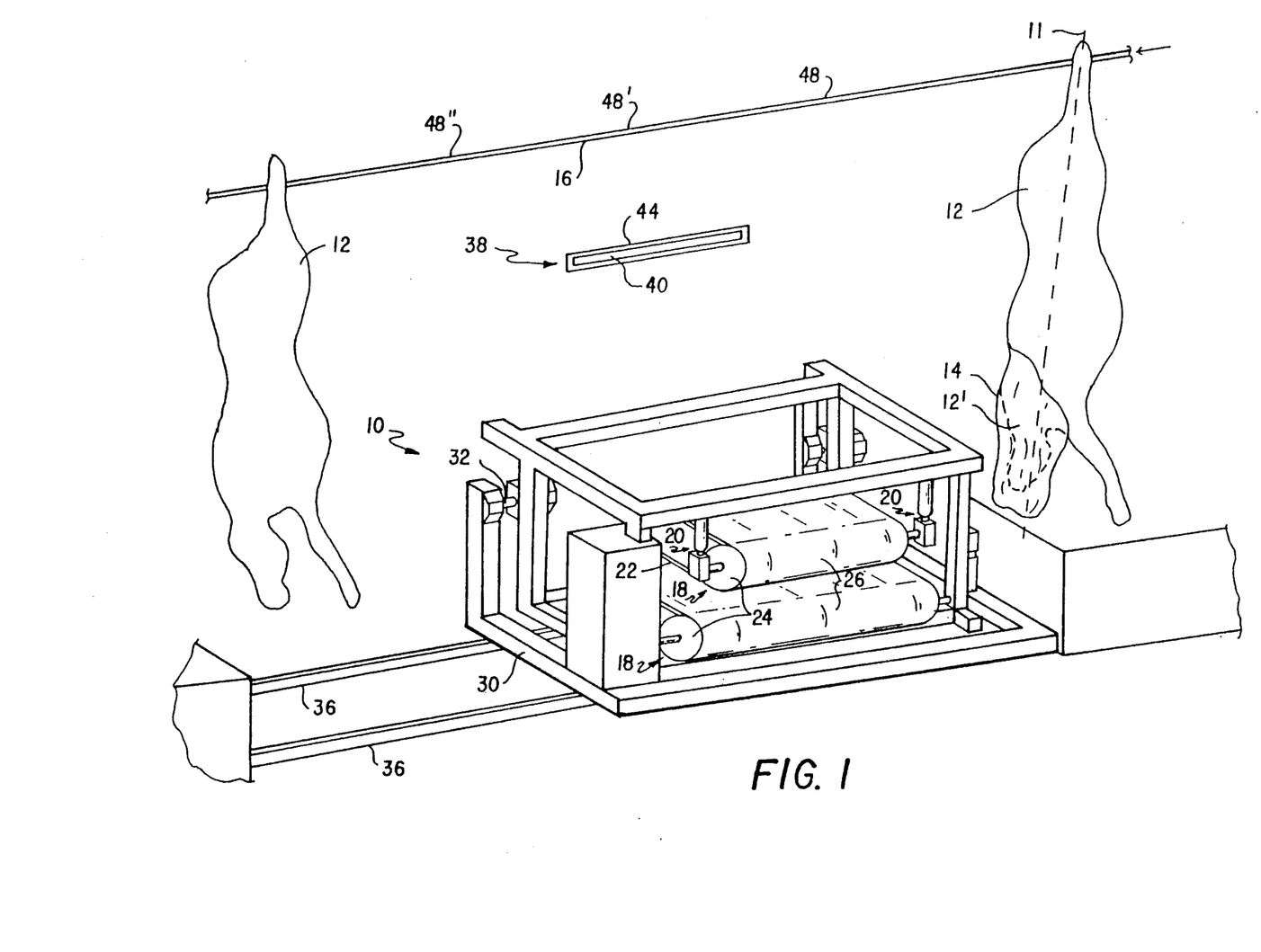
FIG. 1 is a perspective view of an apparatus constructed in accordance with an embodiment of the present invention in a lowered and spaced position.
Figure 2:
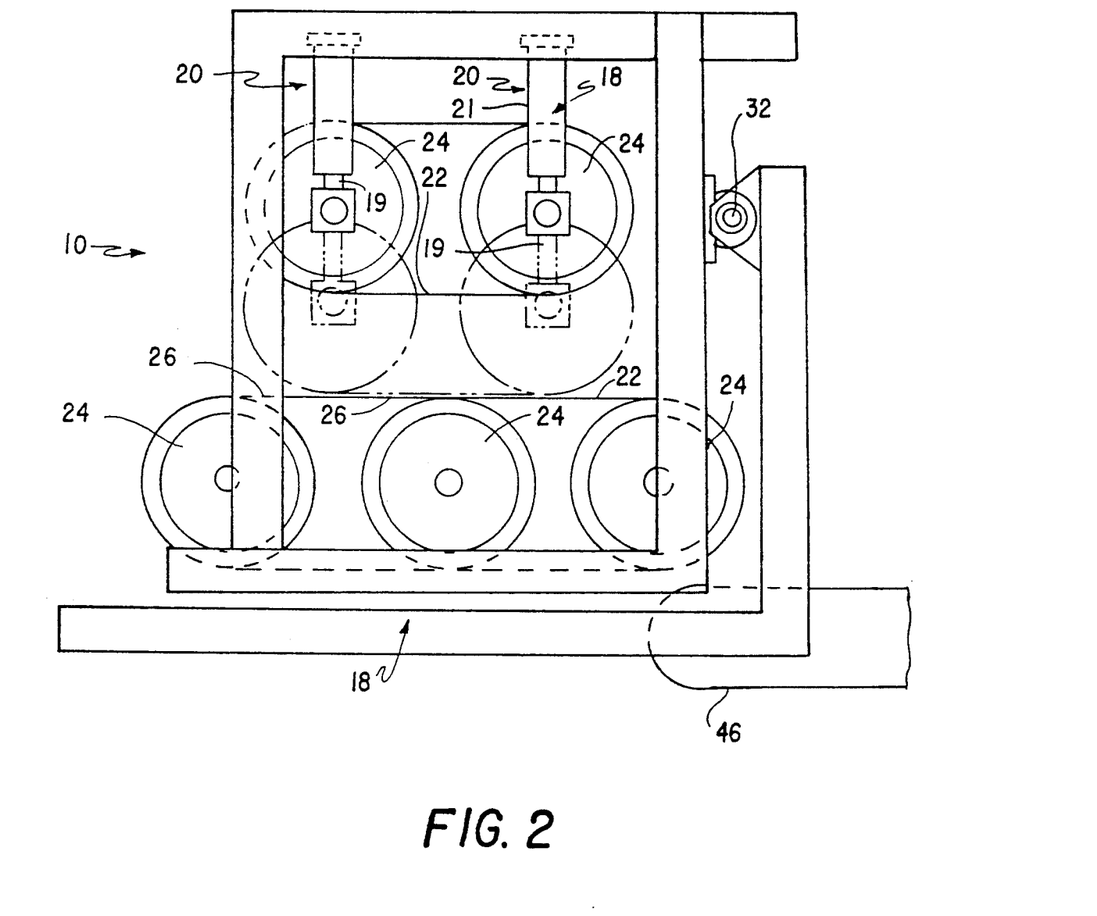
FIG. 2 is a side view of the apparatus of FIG. 1.

In FIGS. 1-4, like items are identified by like and corresponding numerals for ease of reference. Referring first to FIGS. 1 and 2, perspective and side views, respectively, of a downpulling assembly constructed in accordance with the present invention is generally identified by the reference numeral 10. The downpulling assembly 10 is employed at a hide pulling station of a slaughterhouse processing line. Before reaching the downpulling assembly 10, a carcass 12 may be processed at a number of preliminary stations including: a stunning station where the animal, for example a cow, is immobilized; a slaughter station where the animal is dispatched; a station where the carcass 12 is bled, for example, by cutting arteries in the neck region and inverting the carcass 12; and a preliminary pulling station where a hide 14 is detached from the rear legs, hind quarters and sides of the carcass 12 so that the hide 14 remains attached only around the shoulders, neck, head and front legs of the carcass 12. Typically, the carcass 12 is transported to the downpulling assembly 10 by a conveyor generally indicated by a line 16, suspended therefrom by its hind legs such that a longitudinal axis 11 of the carcass 12 is generally transverse to the path of the conveyor 16. For example, if the carcass 12 is suspended by its hind legs, the longitudinal axis 11 may be substantially vertical. As illustrated in FIG. 1, a portion of the hide 14 hangs downwardly over a head 12' (indicated by hidden lines) of the carcass 12 as the carcass 12 approaches the downpulling assembly 10.

The downpulling assembly 10 comprises a plurality of counterrotating members 18 which engage the hide 14 and a gripping assembly 20 which urges the members 18 together in order to grip the hide 14 therebetween and pull the hide 14 from the carcass 12. The counterrotating members 18 may comprise rollers, rotating cylinders or other rotating members. A drive motor may be provided to impart rotational motion to the members 18 in a manner well-known in the art. For example, the motor and members 18 may be interconnected by a drive shaft and gears, or through drive chains and sprockets. Separate motors may be provided to drive each member 18 or a single motor and a drive assembly including an appropriate transmission mechanism could be provided. In the illustrated embodiment, each of the counterrotating members 18 comprises a belt 22, e.g., a gravel belt, disposed in a loop around drums 24 which are, for example sixteen inches in diameter. The members 18 are disposed so that two closely moving opposing surfaces 26 are provided at the interface therebetween. Preferably, the opposing surfaces 26 move at substantially the same speed thereby reducing the likelihood of hide 14 damage due to frictional stretching of the hide 14.

The gripping assembly 2 is operatively associated with at least one of the counterrotating members 18 to move the members 18 together or apart. The gripping assembly 20 comprises, for example, a pneumatic, hydraulic, or other motor to move at least one of the counterrotating members 18. The members 18 are thereby moveable between a spaced apart position and a gripping position as shown in phantom in FIG. 2. In the spaced position, a gap is provided between the members 18 to allow receipt and engagement of the hide 14. The members 18 may then be moved to the gripping position by activation of the gripping assembly 20 to move the members 18 together so that a gripping force is exerted on the hide 14. As shown in FIGS. 1 and 2, the members are moved together by extension of the cylinder rods 19 from cylinders 21 thereby urging the upper member 18 toward the lower member 18.

Figure 3:
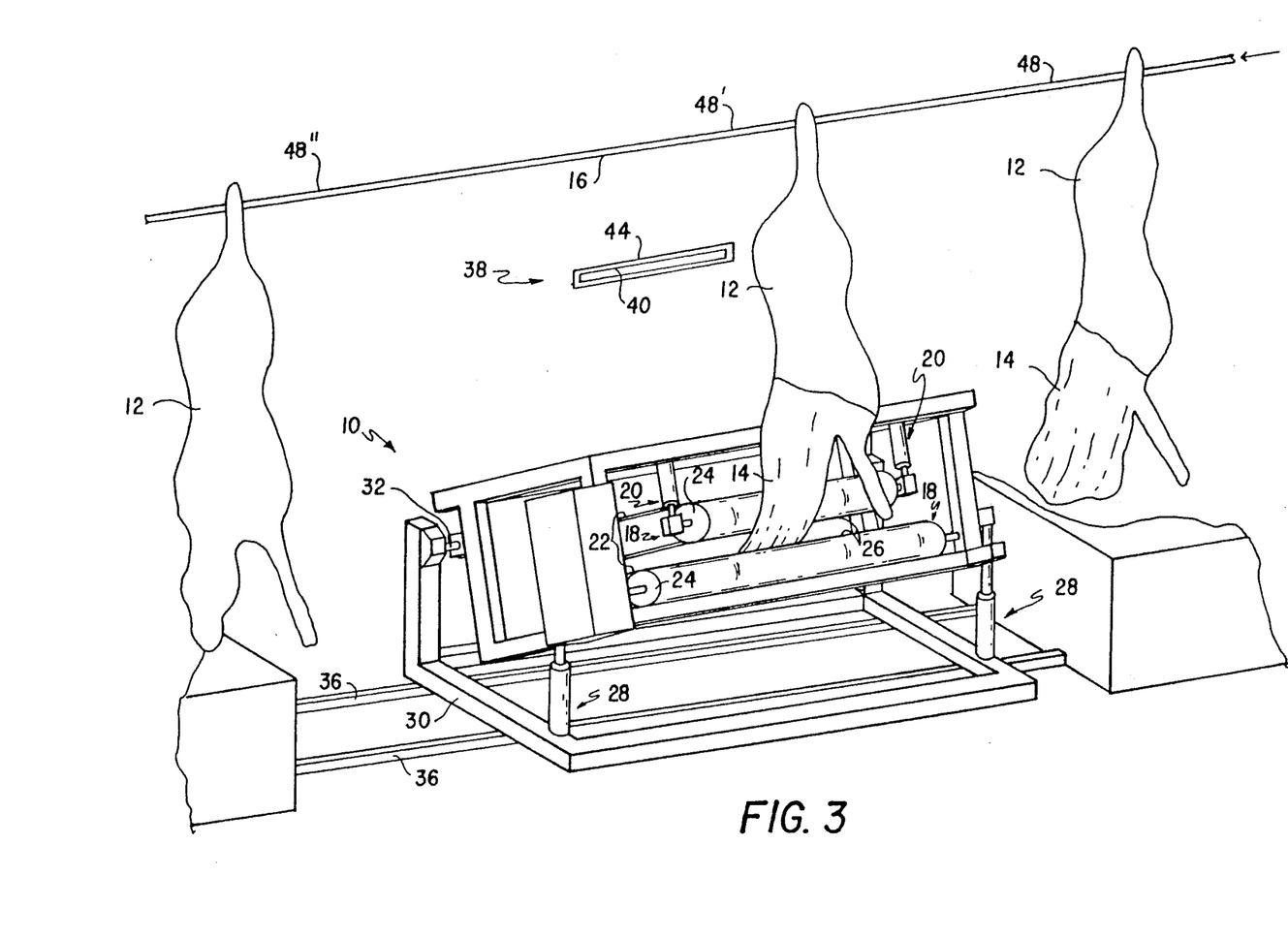
FIG. 3 is a perspective view of the apparatus of FIG. 1 in a raised and spaced position.

Referring to FIG. 3, a perspective view of the assembly 10 engaging a hide 14 hanging downwardly from the carcass 12 is shown. The assembly 10 is positioned beneath the carcass 12 so that the hanging hide 14 may be engaged without need of an operator for inserting the hide 14 between the members 18. The positioning of the assembly 10 beneath the carcass 12 provides the further advantage that it facilitates "peeling" of the hide 14 thereby reducing the likelihood of longitudinal stretching. It has been found that peeling, or pulling the hide in direction generally parallel to a longitudinal axis 11 of the carcass 12, reduces the pulling force which must be exerted on the hide 14.

An assembly 28 for raising and lowering the assembly 10 is provided. The assembly 2 is synchronized with movement of the carcass 12 and the conveyor 16, as will be described below, so that a hide 14 is received when the members 18 are in a raised and spaced position. In the illustrated embodiment, the members 18 are pivotally mounted on a frame 30 through an axis 32. The assembly 28 for raising and lowering may thus comprise a pneumatic, hydraulic or other motor disposed between the frame 30 and the members 18 to pivotally raise and lower the members 18. The members 18 are thereby moveable transverse to movement of the carcass 12. That is, the members 18 may be moved towards or away from the carcass 12 by raising or lowering the assembly 10. Thus, the members 18 may be raised from a lowered position (FIG. 1) to a raised position (FIG. 3) to engage the hide 14. As shown in FIG. 3, the members 18 are in a spaced position to receive the hide 14.

Figure 4:
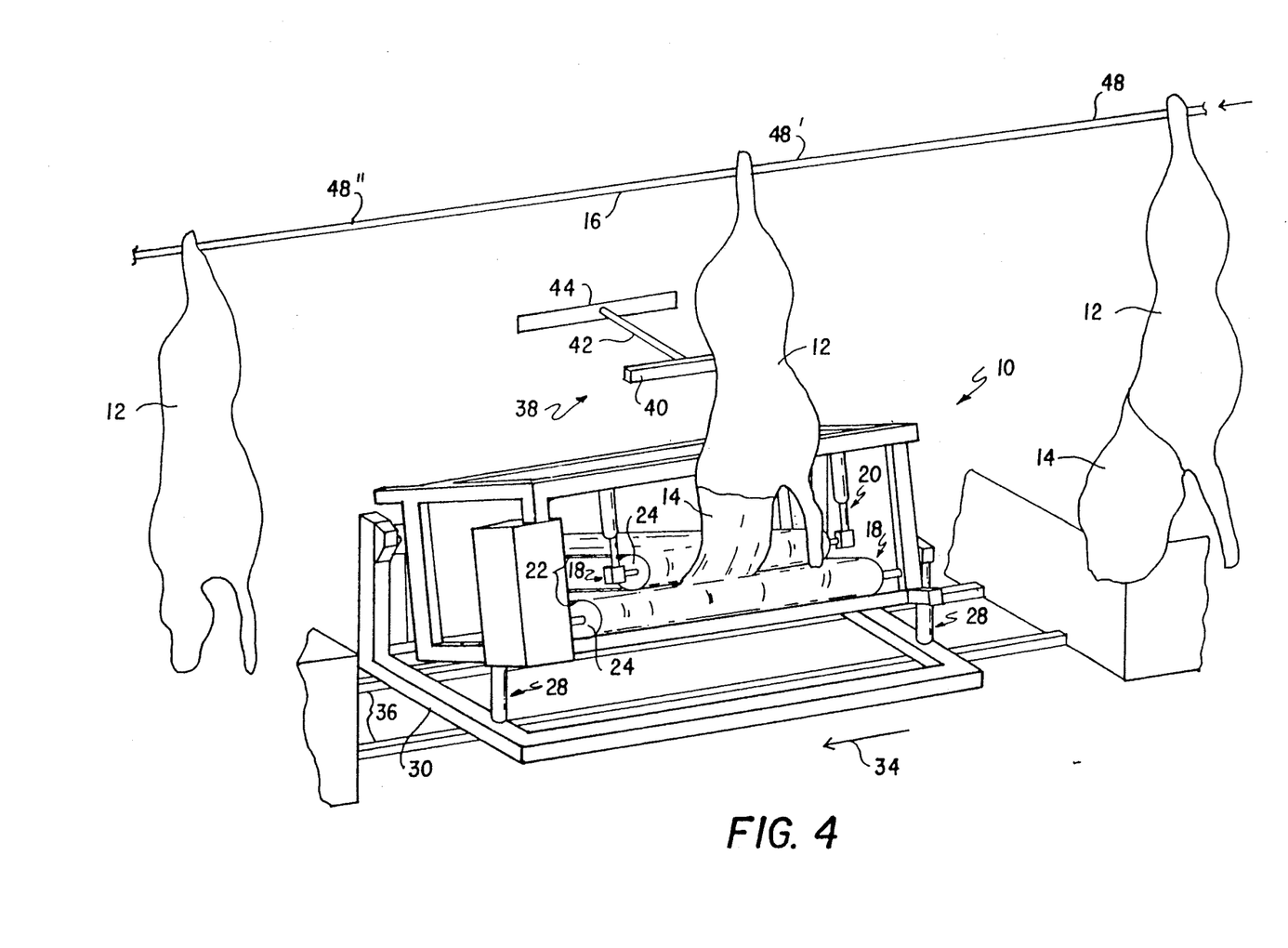
FIG. 4 is perspective view of the apparatus of FIG. 1 in a partial lowered and gripping position.

Referring to FIG. 4, a perspective view of the assembly 10 pulling the hide 14 is shown. The assembly 10 may move laterally, as generally identified by an arrow 34, to substantially match the movement of the carcass 12 as the hide 14 is removed therefrom. This allows the hide 14 to be removed from the carcass 12 while suspended from the continuously moving conveyor 16 without exerting undue lateral force on the conveyor 16 thereby reducing stress on the conveyor drive means (not shown). Therefore, it is not necessary to stop the conveyor 16 at the downpulling assembly 10, and processing line speed and plant capacity are accordingly enhanced. Any suitable means may be provided to impart lateral movement to the assembly 10, for example, wheels, rollers, rails or the assembly may be slidable on guiderails or in a channel. In the illustrated embodiment, the assembly 10 is mounted on rails 36 and is moved by a power source such as a pneumatic, hydraulic or other motor (not shown). Of course, cables, chains or other means could be employed to move the assembly 10.

In FIG. 4, the members 18 are shown in a gripping and partially lowered position. After engagement of the hide 14, the gripping assembly 20 is activated to urge the members 18 together so that the hide 14 is contacted and gripped therebetween. The moving opposing surfaces 26 (See FIG. 1) of the members 18 thereby progressively grip portions of the hide 14 and pull the hide 14 off the carcass 12. As can be understood, the pulling force is therefore spread relatively evenly over the hide 14 as the hide 14 is removed from the carcass 12 thereby reducing the likelihood of damage thereto. The raising and lowering assembly 28 may be employed to lower the members 18 away from the carcass 12 as the hide 14 is removed, thereby assisting in the removal.

Removal of the hide 14 may also be assisted by application of an electric current to stiffen the carcass 12. As is known, application of a current may prevent spinal separation and ripping of adjacent meaty portions which could otherwise occur when a pulling force is exerted generally parallel to the carcass, 12 spine. A retractable device 38 for applying an electric current to the carcass 12 comprises, for example, a contact portion 40 such as an electrode or other electrical element mounted on a retractable arm 42. The device 38 is moveable between a retracted position (FIGS. 1 and 3) and an extended position (FIG. 4). In the retracted position, the contact portion 40 may be received by a housing 44 wherein the portion 40 is sterilized to reduce carcass cross-contamination. In the extended position, the portion 40 contacts the carcass 12 thereby applying an electric current thereto. Preferably, extension of the portion 40 is synchronized with movement of the carcass 12 on conveyor 16, as will be described below, so that the carcass 12 is stiffened substantially as the maximum pulling force is exerted. For example, the maximum pulling force may be exerted when the hide 14 is pulled over the head of the carcass 12.

The removed hide 14 may then be transported by hide conveyor 46 (See FIG. 2) for further processing at, for example, a tanning station. The hide conveyor 46 is positioned to receive the removed hide 14 after the hide 14 is drawn between the members 18. In the illustrated embodiment, the hide conveyor 46 is positioned beneath the members 18 to receive hides 14 dropped therefrom. Therefore, no operator is required to collect or unwind the removed hides 14 which further reduces labor requirements an improves hygiene. After removal of a hide 14, the assembly 10 is automatically reset to receive another hide 14. That is, the assembly 10 is moved laterally and the members 18 are returned to the spaced and lowered position as in FIG. so that the above-described cycle may be repeated.

Various movements of the assembly 10, members 18, and the assembly 38 may be synchronized with movement of the carcass 12 and the conveyor 16. For example, triggering devices, such as limit switches, positions of which are generally identified by arrows 48, 48' and 48" are provided such that movement of the carcass 12 with the conveyor 16 causes a signal to be transmitted, thereby activating operation of the assembly 10. In the illustrated embodiment, three limit switches are employed. A first limit switch 48 is used to trigger the assembly 28 to raise the members 18 from the lowered position of FIG. 1 to the raised position of FIG. 3 and also to initiate lateral movement of the assembly 10. A second switch 48' is used to trigger movement of the gripping assembly 20 to the gripping position, and to trigger lowering of the members 18 by the assembly 28. This switch may also trigger extension of the retractable device 38. Finally, a third switch 48" is used to reset the assembly 10 to the position of FIG. 1. Although the specific embodiment described employs three limit switches, it will be understood that other types and arrangements of triggering devices could be employed. For example, the triggering devices could comprise radiation sensors, such as electric eyes, or magnetic sensors. Similarly, a single triggering device 48 and suitable delay means could be employed instead of multiple triggering devices 48, 48' and 48".

Figure 5:
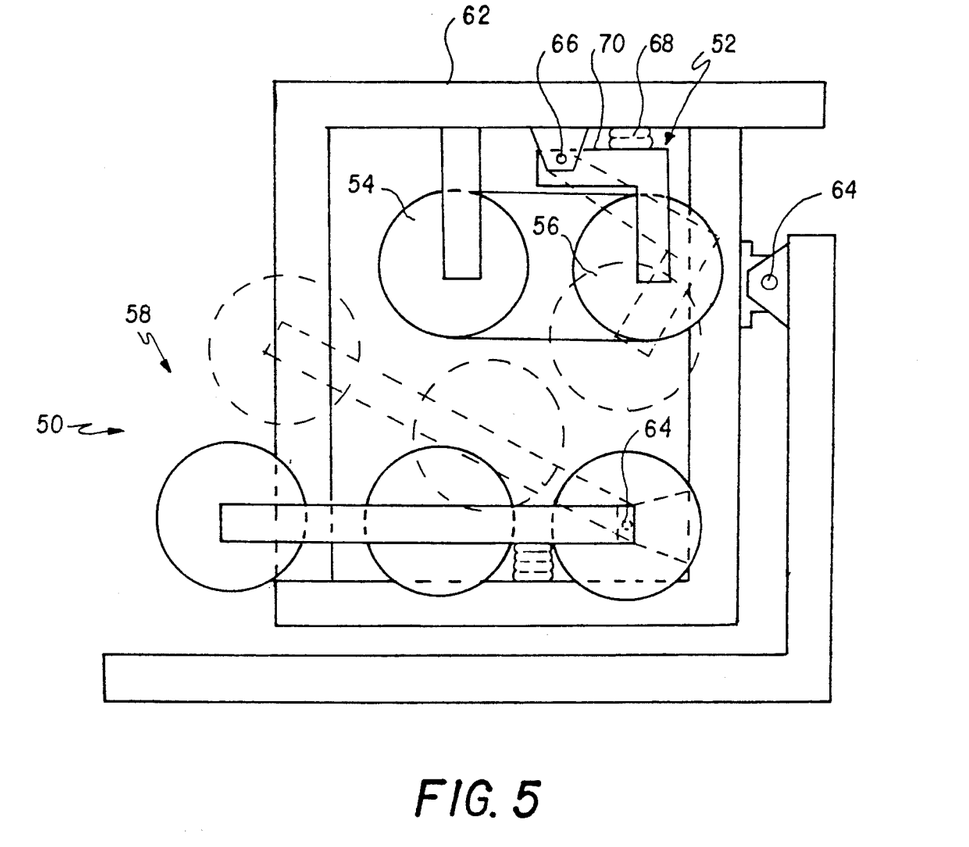
FIG. 5 a side view of a gripping means constructed in accordance with another embodiment of the present invention.

Referring to FIG. 5, an alternative embodiment of a gripper is generally identified by the reference numeral 50. The gripper 50 is employed in connection with an upper counterrotating member 52, which includes front and rear drums 54 and 56, respectively, and a lower counterrotating member 58 which includes three drums. The lower member 58 is pivotally mounted on frame 62 about an axis generally identified by a point 64. The rear drum 56 is pivotally mounted on frame 62 about an axis generally identified by a point 66 while the front drum 54 is fixedly mounted on the frame 62. First and second pneumatic devices 67 and 68, such as air bags, are provided to pivotally move the rear drum 56 downward and the lower member 58 upward so that the members 52 and 58 move from a spaced apart position to a gripping position (as shown in phantom). The first device 67 is disposed between the lower member 58 and the frame 62 so that the member 58 is raised when the device 67 is expanded. Similarly, the second device 68 is disposed between a pivot arm 70 and the frame 62 so that the rear drum 56 is lowered when the device 68 is expanded. It is an advantage of this embodiment that the front drum 54 is fixedly mounted on the frame 62. When a hide is pulled from a carcass, an upwardly directed force is exerted on the front drum 54. If a device was provided to move the front drum downward, the device would have to counteract this upwardly directed force. Thus, it is believed that certain efficiencies may be achieved by fixedly mounting the front drum 54 and moving only the rear drum 56 and lower member 58. Although not shown it is to be understood that belts similar to the gravel belts as previously described above are used in conjunction with the gripper 50.

Figure 6:
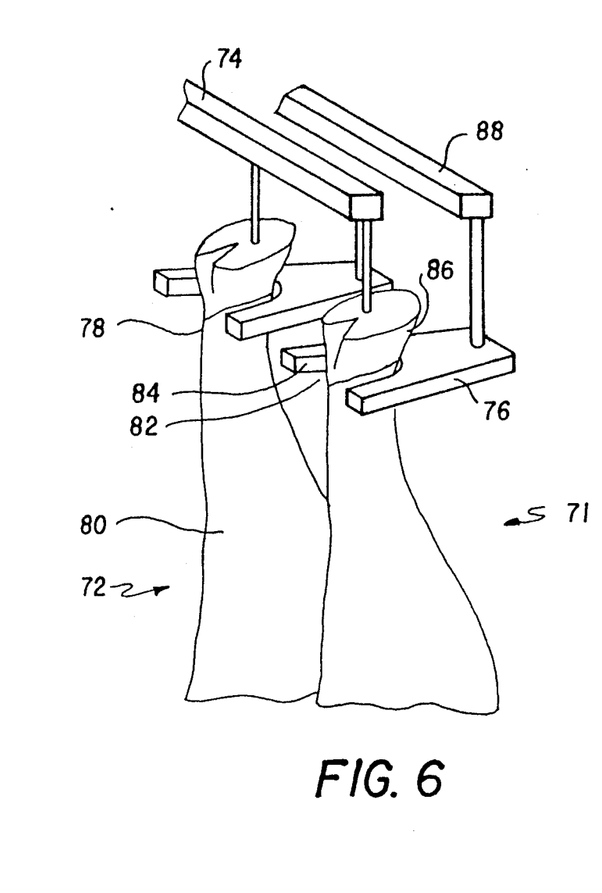
FIG. 6 is a perspective view of a carcass leg holding assembly constructed in accordance with an embodiment of the present invention.
Figure 7:
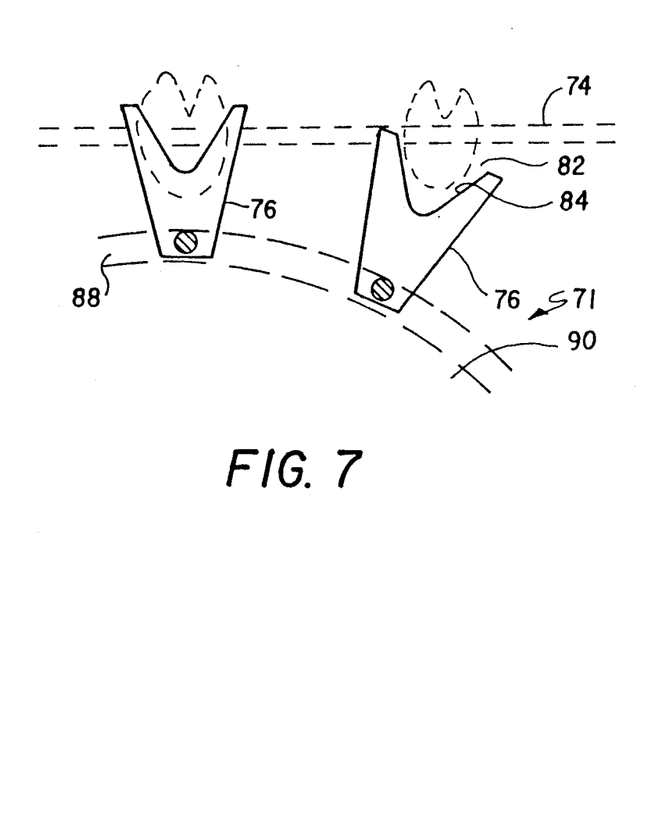
FIG. 7 is a top elevation of the assembly of FIG. 6.
Figure 8:
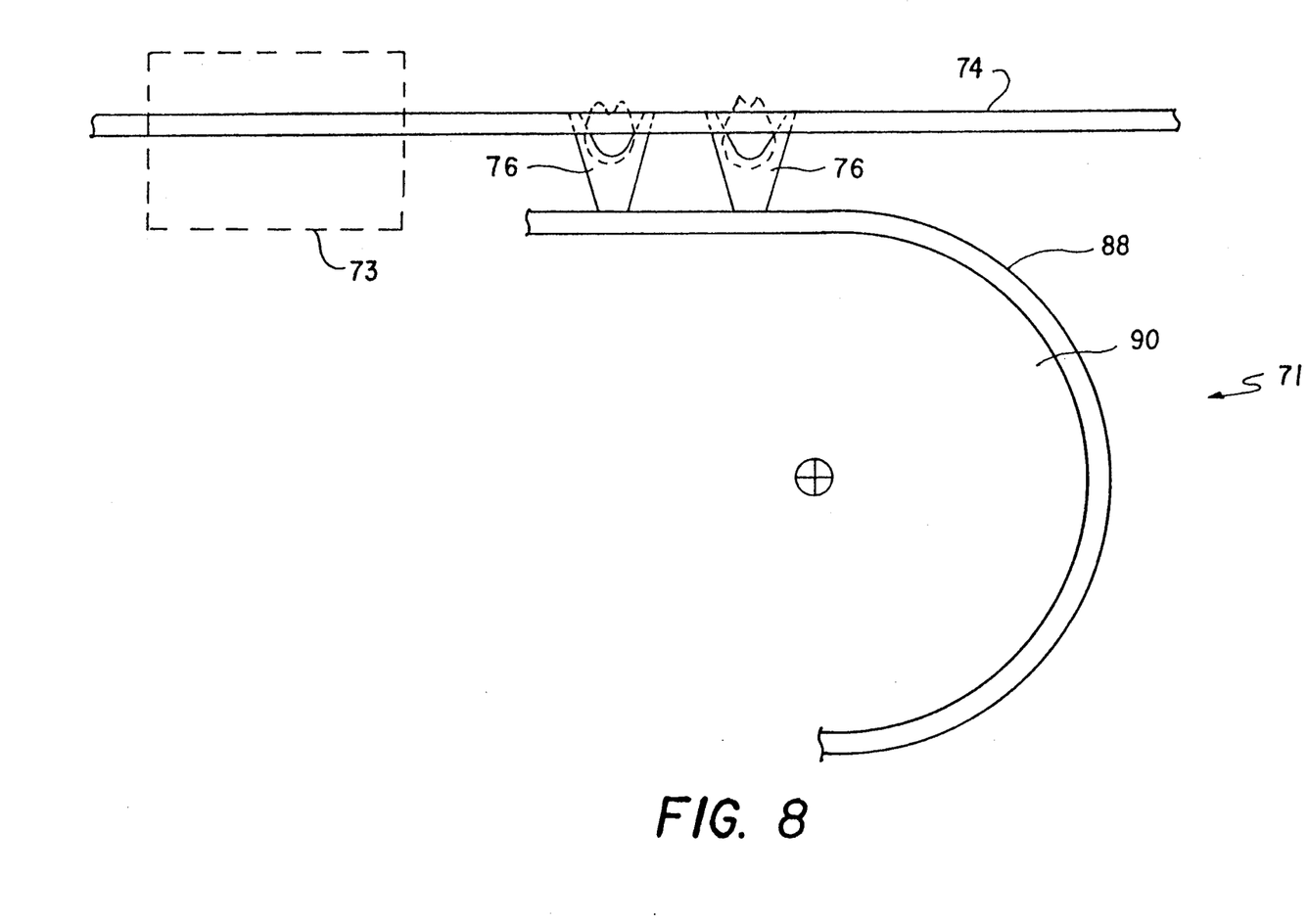
FIG. 8 is a side elevation of a hide pulling station incorporating the assembly of FIG. 6.

Referring to FIGS. 6-8, a carcass leg holding assembly in accordance with the present invention is generally identified by the reference numeral 71. A problem associated with prior art downpulling assemblies is the tendency of a carcass 72 to be pulled from a carcass conveyor 74, when a downpulling assembly 73 pulls the hide, resulting in line stoppage and reduced plant yield.

This problem may be alleviated in accordance with the present invention by use of the leg holding assembly 71. The assembly 71 comprises a plurality of generally "V" shaped fork members 76 which engage a narrowed portion 78 of carcass legs 80. As will be described in more detail below, the narrowed portions 78 are progressively received within the members 76 through an open end 82 thereof so that the narrowed portions 78 abut interior walls 84 of the members 76. Thus engaged, the members 76 reduce downward passage of broader bony portions 86 of the legs 80 through the members 76, thereby reducing the likelihood that the carcass 72 will be pulled from the carcass conveyor 74.

The narrowed portions 78 are automatically engaged by the members 76 which travel with the carcass 72 during the downpulling operation. In the illustrated embodiment, the members 76 are interconnected with a conveyor 88 which is disposed about a hub 90. The conveyor 88 is located so that it closely parallels the carcass conveyor 74 through the hide pulling station. In addition, the speed of the conveyors 74 and 88 may be controlled so that the speed of the members 76 matches the speed of the carcass 72. This may be accomplished by co-driving the conveyors 74 and 88 from a common power source through appropriate linkage, as is well known in the art.

The narrowed portions 78 are engaged by the members 76 as the conveyors 74 and 88 substantially parallel each other. The members 76 are interconnected to the conveyor 88 so that the open ends 82 of the members 76 are away from the hub 90 as the members 76 pass thereabout. This allows the members 76 and narrowed portions 78 to mesh as the conveyors 74 and 88 become substantially parallel. Of course, to ensure that the members 76 merge with the narrowed portion 78, the distances between successive members 76 along the conveyor 88 should be equal to the distances between corresponding narrowed portions along the conveyor 74. Finally, if the downpulling assembly is located to one side of the conveyor 74, it is desirable that the assembly be located on the same side so that the narrowed portions 78 are urged against the walls 84 as the hide is pulled from the carcass.

In operation, the present invention provides a method and apparatus for automatically removing hides 14 from carcasses 12. The assembly 10 moves from a lowered and spaced position (FIG. 1 to a raised and spaced position (FIG. 2) to engage a hide 14 hanging downward from a carcass 12. After engagement the members 18 are urged together by the gripping assembly 20 so that the hide 14 is gripped and pulled therebetween. As the hide 14 is pulled, the assembly 10 may be moved laterally, to substantially match the movement of the carcass 12, and simultaneously lowered away from the carcass 12 to assist in removal of the hide 14. A retractable device 38 for applying an electric current may be employed to stiffen the carcass 12 thereby reducing the likelihood of spinal separation. A hide conveyor 46 may be disposed beneath the members 18 to automatically receive removed hides 14 and transport the hides 14 to further processing stations. Finally, the assembly 10 and members 18 are reset to the position of FIG. 1 in preparation to receive another hide 14.

The present invention has a number of advantages. First, the method and apparatus of the present invention removes hides automatically, i.e., without the need for manual implementation. This is accomplished in part by receiving a hide which is hanging downward from a carcass, thereby eliminating the need for an operator to insert the hide into a hide-pulling assembly. The present invention thus reduces dangerous working conditions, reduces labor requirements, and improves product hygiene.

In addition, the present invention reduces damage to the hides. The pulling force is spread relatively evenly over the hides as the hides are peeled from the carcasses and progressively drawn between the members 18. In addition, the likelihood of stretching of the hides is reduced because the members 18 are positioned beneath the carcass 12 to facilitate peeling of the hide. Damage to the hides is thus reduced thereby further enhancing profitability.

The present invention also provides an improved rate of hide removal. The present invention allows the hides to be removed from carcasses without stopping the conveyor. Moreover, the hides are pulled between moving opposing surfaces, rather than being wrapped about a rotating member, so that a time consuming unwrapping step is not required. The present invention is capable of removing hides from approximately 400 carcasses per hour as compared to about 250 carcasses per hour using prior art hide removal assemblies.

Finally, it is anticipated that the apparatus of the present invention will require a reduced amount of continuing maintenance. The present apparatus, particularly when driven by hydraulic motors, requires relatively few mechanical parts. In addition, where the counterrotating members 18 are comprised of a gravel belt 22 and a plurality of drums 24, it has been found that the necessary pulling force can be produced at a relatively slow rate of revolution (about 35 revolutions per minute). It is thus expected that infrequent changes of the belt 22 will be required, thereby reducing down time and further improving plant capacity.

Although the present invention has been described with respect to specific embodiments thereof, various changes and modifications may be suggested to one skilled in the art and it is intended that the present invention encompass such changes and modifications as fall within the scope of the appended claims.

What is claimed is:

1. An apparatus for automatically removing a hide from an inverted bovine carcass, wherein a previously detached portion of said hide hangs downwardly over said carcass' head, comprising:

a plurality of counterrotating members positioned beneath said carcass, said members movable between a first position wherein said members are separated to receive said detached, hanging portion therebetween and a second position wherein said members are pressed together to frictionally engage said hide and exert a pulling force thereon;

elevator means for raising said counterrotating members toward said carcass wherein said detached, hanging hide portion is received between said counterrotating members beneath said carcass; and gripping means for urging said counterrotating members together, wherein said hide is gripped therebetween, pulled over said carcass' head and removed from said carcass.

2. The apparatus of claim 1, wherein said gripping means comprises a motor operatively associated with at least one of said counterrotating members to move said at least one member relative to another of said counterrotating members.

3. The apparatus of claim wherein said gripping means urges said counterrotating members together responsive to a signal indicative of carcass position.

4. The apparatus of claim 3, wherein said signal is transmitted by sensing means including a limit switch.

5. The apparatus of claim 4, wherein said switch is activated by movement of the carcass.

6. The apparatus of claim 4, wherein said switch is activated by movement of a carcass conveyor.

7. The apparatus of claim 1, wherein said counterrotating members comprise a belt.

8. The apparatus of claim I, wherein said counterrotating members remain substantially beneath said carcass while the hide is removed thereby reducing lengthwise stretching of the hide.

9. The apparatus of claim 1, comprising: an electrical element to stiffen the carcass.

10. The apparatus of claim 9, wherein said element comprises an electrical device moveable between an extended and a retracted position, the device contacting and applying an electrical current to said carcass in an extended position.

11. The apparatus of claim 10 further comprising:
a sterilizer to sterilize said device after said device contacts said carcass.

12. The apparatus of claim 1, comprising:
a motor to impart lateral movement to said members to substantially match the movement of said carcass so that said members remain substantially beneath said carcass as said hide is pulled therefrom.

13. The apparatus of claim 1, comprising:
a motor to move said members between a raised and a lowered position, the members engaging said hide in the raised position and exerting a pulling force on said hide due to movement from the raised to the lowered position.

14. The apparatus of claim 1, comprising:
a first triggering device to initiate movement of said members to engage said hide;
a second triggering device to initiate movement to grip and pull said hide; and
a third triggering device to initiate movement to reset said members in preparation for subsequent carcasses.

15. The apparatus of claim 1, further comprising:
a carcass leg holding assembly to substantially prevent said carcass from being pulled from a carcass conveyor, said assembly comprising a forked member to engage a narrowed portion of a carcass leg.

16. The apparatus of claim 15, wherein said forked member is generally V-shaped and said narrowed portion is engaged in an interior portion thereof.

17. The apparatus of claim 15, wherein said forked member is interconnected to a conveyor which moves to substantially match the movement of said carcass conveyor, wherein said forked member and said narrowed portion remain engaged as said carcass moves through a downpulling station.

18. An apparatus for removing a hide from a bovine carcass suspended by at least one rear leg from a continuously moving conveyor, comprising:
a downpulling assembly including a plurality of counterrotating members, the members movable between a first position wherein said members are separated to receive a portion to said hide hanging over said carcass' had and a second position wherein said members are pressed together to frictionally engage said hide and exert a pulling force thereon;
means for laterally moving said assembly for positioning said assembly beneath the carcass during removal of the hide; and
means for transversely moving said assembly relative to the direction of movement of said carcass in a first direction and in a second direction, at least one of said first and second directions being directed away from the carcass, during removal of the hide, thereby exerting a pulling force on said hide effective to pull said hide over said carcass' head and remove said hide from said carcass.

19. The apparatus of claim 18, wherein said assembly comprises opposed closely moving surfaces to grip the hide therebetween.

20. The apparatus of claim 19, wherein said opposed surfaces comprise belts to frictionally contact said hide.

21. The apparatus of claim 19, further comprising a motor to move said surface between said first position and said second position.

22. The apparatus of claim 18, further comprising:
an electrical element to apply a current to the carcass in order to stiffen the carcass.

23. The apparatus of claim 18, comprising:
an extendable electrical element, wherein said element is extended to contact and stiffen said carcass substantially as said counterrotating members move away from the carcass.

24. The apparatus of claim 23, wherein said element is extended responsive to a signal indicative of carcass position.

25. The apparatus of claim 18, further comprising a carcass leg holding assembly to substantially prevent the carcass from being pulled from the conveyor, said holding assembly comprising a forked member to engage a narrowed portion of a leg of the carcass.

26. The apparatus of claim 18, wherein said means for transversely moving comprises means for lowering said assembly away from said carcass.

27. The apparatus of claim 18, wherein said means for transversely moving simultaneously moves said assembly in said first direction and in said second direction along an arcuate path.

28. The apparatus of claim 18, wherein said means for transversely moving pivotally moves said assembly, thereby increasing the pulling leverage of said assembly.

29. A method for removing a hide from an inverted bovine carcass suspended from a moving conveyor, comprising the steps of:
raising a hide pulling assembly to engage a portion of said hide hanging over the carcass' head, said assembly comprising two counterrotating members;
engaging said hide between said members;
moving said members together to grip and pull said hide;
moving said assembly laterally to substantially match movement of the conveyor; and
lowering said assembly away from said carcass to assist in pulling said hide over said carcass' head.

30. The method of claim 29, further comprising the steps of:
applying an electrical current to the carcass by contacting the carcass with an electrical element, thereby stiffening the carcass.

31. The method of claim 30, further comprising the step of:

sterilizing said element between hide pulling operations.

32. The method of claim 29, further comprising the step of:
initiating said step of raising responsive to a signal indicative of carcass position.

33. The method of claim 29, further comprising the step of:
initiating said step of lowering responsive to a signal indicative of carcass position.

34. The method of claim 29, further comprising the step of:
holding a carcass leg during said hide pulling operation so that the carcass is not pulled from the conveyor.

35. The method of claim 34, wherein said step of holding comprises:
engaging a narrowed portion of said leg within a forked member; and
moving said member to substantially match the movement of the carcass during said hide pulling operation.

36. A method for pulling a hide from an inverted bovine carcass, wherein a previously detached portion of aid hide hangs freely downwardly over said carcass' head, comprising the steps of:
engaging the hide between counterrotating members beneath said carcass, the members movable between a first position wherein said members are separated to receive said detached, hanging portion therebetween and a second position wherein said members are pressed together to frictionally engage said hide and exert a pulling force thereon;
raising said counterrotating members so that said detached, hanging portion is received therebetween;
moving said members together to grip said hide; and
rotating said members to exert a pulling force on said hide.

37. The method of claim 36, wherein said step of rotating comprises driving a belt around at least one roller.

38. The method of claim 36, further comprising the step of:
suspending the carcass from a continuously moving conveyor with a longitudinal axis of the carcass transverse to a path of said conveyor.

39. The method of claim 38, further comprising the step of:
moving said members laterally to substantially match movement of the conveyor.

40. The method of claim 36, further comprising the step of:
moving said members away from the carcass to exert a pulling force on the hide.

41. The method of claim 36, further comprising the step of:
applying an electric current to the carcass to stiffen the carcass.

42. The method of claim 36, further comprising the step of:
automatically delivering the hide removed from the carcass to a hide conveyor.

43. An apparatus for holding a carcass during hide removal, comprising:
a carcass conveyor from which said carcass is suspended by at least one leg; and
leg holding means for holding a narrowed portion of said leg to reduce the likelihood of the carcass being pulled from said conveyor as the hide is removed, the leg holding means including a forked ember to engage the narrowed portion of said leg therein, wherein said forked member is interconnected to a conveyor which is disposed about a hub, said conveyor substantially merging with said carcass conveyor near a portion of said hub, wherein said forked member meshes with said narrowed portion as said conveyor substantially merges with said carcass conveyor.

44. An apparatus for holding a carcass during hide removal, comprising:
a carcass conveyor from which said carcass is suspended by at least one leg;
leg holding means for holding a narrowed portion of said leg to reduce the likelihood of said carcass being pulled from said conveyor, the leg holding means comprising a substantially rigid, V-shaped member to receive said narrowed portion of said leg therein, the substantially rigid V-shaped member having a first open end and progressively narrowing from the first end to a second end thereof; and
means for moving said substantially rigid, V-shaped member towards said leg, wherein said narrowed portion of said leg is received through the first, open end so that said narrowed portion of said leg abuts against said substantially rigid, V-shaped member.

45. The apparatus of claim 44, further comprising:
a second conveyor for moving said leg holding means.

* * * * *